US011316698B2

(12) United States Patent
Truu et al.

(10) Patent No.: US 11,316,698 B2
(45) Date of Patent: Apr. 26, 2022

(54) DELEGATED SIGNATURES FOR SMART DEVICES

(71) Applicant: Guardtime SA, Lausanne (CH)

(72) Inventors: Ahto Truu, Tartu (EE); Denis Firsov, Tallinn (EE)

(73) Assignee: Guardtime SA, Lausanne (CH)

( * ) Notice: Subject to any disclaimer, the term of this patent is extended or adjusted under 35 U.S.C. 154(b) by 0 days.

(21) Appl. No.: 16/932,613

(22) Filed: Jul. 17, 2020

(65) Prior Publication Data

US 2021/0021429 A1    Jan. 21, 2021

Related U.S. Application Data

(60) Provisional application No. 62/875,371, filed on Jul. 17, 2019.

(51) Int. Cl.
| H04L 9/08 | (2006.01) |
| H04L 9/14 | (2006.01) |
| H04L 9/30 | (2006.01) |
| H04L 9/32 | (2006.01) |

(52) U.S. Cl.
CPC ............ *H04L 9/3247* (2013.01); *H04L 9/085* (2013.01); *H04L 9/14* (2013.01); *H04L 9/3073* (2013.01); *H04L 9/3242* (2013.01)

(58) Field of Classification Search
CPC ... H04L 9/3073; H04L 9/3247; H04L 9/0825; H04L 9/085; H04L 9/3226; H04L 9/14; H04L 9/3297; H04L 9/088; H04L 9/3242; H04L 2209/76
See application file for complete search history.

(56) References Cited

U.S. PATENT DOCUMENTS

| 2017/0206523 A1* | 7/2017 | Goeringer ............ G06Q 20/409 |
| 2017/0257358 A1* | 9/2017 | Ebrahimi .............. G06F 21/645 |
| 2018/0117446 A1* | 5/2018 | Tran ...................... A42B 3/0433 |
| 2018/0225466 A1* | 8/2018 | Ducatel .................. H04L 9/0637 |
| 2020/0160640 A1* | 5/2020 | Ruskin .................. H04L 9/3239 |
| 2020/0259663 A1* | 8/2020 | Firsov ....................... H04L 9/14 |
| 2020/0320340 A1* | 10/2020 | Wentz .................. G06K 9/6215 |
| 2021/0133903 A1* | 5/2021 | Poole, III ............ G06F 21/6209 |

* cited by examiner

*Primary Examiner* — Mohammad A Siddiqi
(74) *Attorney, Agent, or Firm* — Jeffrey Pearce

(57) ABSTRACT

Data security is provided in the form of a method for digitally signing a data message. A client device issues a issuing a signature request to a server and generates a first signature part as functions of selected ones of first signature parameters. It then receives from the server a second signature part, said second signature part having been computed by the server as functions of second signature parameters and at least one of the first signature parameters. The client device then attempts to verify components of the second signature part and generates a final digital signature of the message only if the components of the second signature part are valid. Part of the computational effort of creating the signature is thus offloaded to the server, even though the server may not be fully trusted.

13 Claims, 2 Drawing Sheets

DELEGATED SIGNATURES FOR SMART DEVICES

CROSS-REFERENCE TO RELATED APPLICATIONS

This application claims priority of U.S. Provisional Patent Application No. 62/875,371, filed 17 Jul. 2019.

TECHNICAL FIELD

This invention relates to data security, in particular by means of digital data signatures.

BACKGROUND

Now that "data" has become a normal, almost invisible, part of the lives of just about everybody in the industrialized world, focus has for many entities shifted to questions of security and integrity of the data. Central to many known solutions to issues such as security and integrity are digital signatures, that is, digital information that is associated with, and often at least partially derived from, the contents of the data set (such as a document) to be signed, and often an indication of the identity of the user/owner. The digital signature may then be used to verify the correctness of the signed data (the "message") with respect to such characteristics as content, originator, time, etc.

Different methods may be used to create digital signatures and verify data sets, defined as any body of digital data. One common signature scheme uses keys that are issued by some certificate authority. The well-known Public Key Infrastructure (PKI) is an example of such a system. One problem with PKI-based signature schemes is not only the need to store and maintain the key sets, but also that PKI keys may expire, along with their underlying digital certificates. This problem is multiplied in environments in which there might be an enormous number of "perishable" key pairs associated with the many documents in circulation. Another disadvantage of PKI-based signature schemes is that they require trust of the issuing authority. Moreover, recent research indicates that some common keys may have "back doors" embedded in them, or may be generated using comprised pseudo-random number seeding routines.

Another increasing data security challenge is the ubiquity of "smart" devices such as mobile phones or items provided with "smart cards" and the desire to be able to secure and/or verify data sets that they generate or receive as well. Many known security solutions generally impose too great a computational and/or storage load on the devices, which usually have fewer and less powerful resources than, for example, a server or even laptop computer.

What is needed is a data signature method that is more suitable for use on smart devices.

DESCRIPTION

Figure 1:
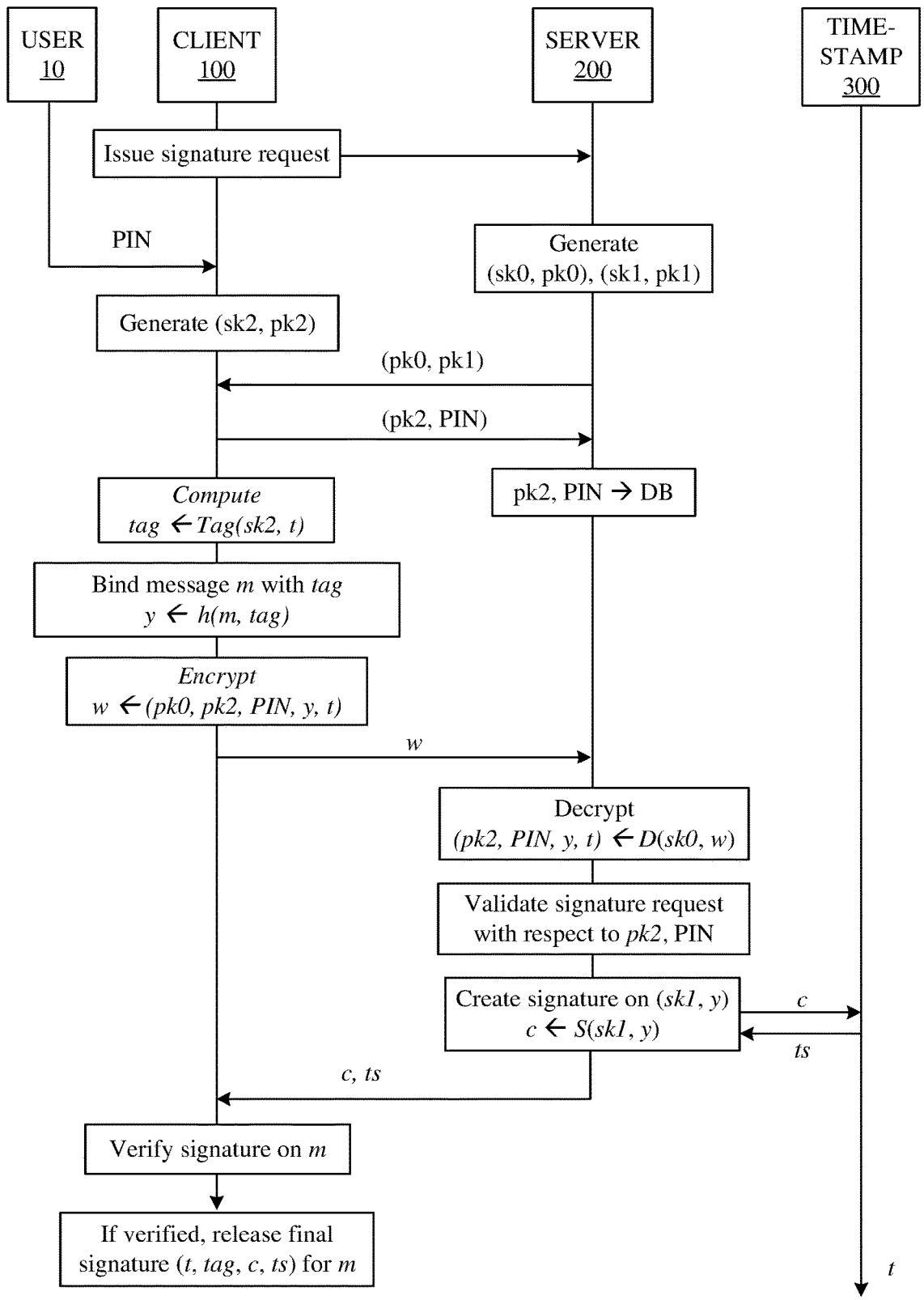
FIG. 1 is a functional flowchart of a first embodiment of a digital signature method in which part of signature formation is delegated by a client to a server.

Smart devices have properties that lead to a threat model typically with some or all of the following features:
1) An attacker monitors network communications.
2a) The attacker can copy the files from a client device at any time or
2b) The server may become corrupted
3) The user has no way of knowing whether his communications are being listened to or whether his device has been copied by an attacker.
4) An honest server refuses further interactions with the user after an n'th (such as third) unsuccessful attempt of signature forming
5) There is a publicly available cryptographic time-stamping service.

Assume that either 2a or 2b may happen, but not both.

Prior art signature schemes such as RSA, XMSS, etc., either suffer serious shortcomings when it comes to solving the described problem, or they cannot solve it at all. One reason is that such prior art signature schemes rely for security on private keys of considerable length. Private keys must therefore be stored on the client device. However, if the private key is stored in plain text then an attacker may obtain the key by copying from the device (assumption 2a). Another option would be to encrypt the private key with a PIN code, but this has the weakness that existing signatures of a user provide an oracle for brute-forcing the typically short PIN.

Another alternative would be to use a server to create signatures. The client device could, for example, hold a public key for asymmetric encryption and use it to encrypt the PIN when sending to the server a request to sign a document. This solution would also fail to satisfy the threat model because the server might become corrupted (assumption 2b) and then forge signatures in the user's name.

Embodiments of this invention provide a solution in which a "semi-trusted server" generates partial signatures for a message (any information, such as data, in digital form that is to be signed) in a user's name in such a way that the user is able to verify the server's part of the signature before it forms a final signature. As a consequence, the server may be used to offload some of the computational and storage burden of creating digital signatures for data, but is still prevented from signing any unapproved content. Moreover, since the smart device (as the "client") does not itself generate and store all the information that would be needed to create valid data signatures, even if the contents of the smart device were to be copied by an attacker, the attacker would not be able to generate fake signatures from those contents alone. Here, the "user" may be a person, but may also be a software process.

In the following description, several routines are described using Python notation in which, for example != is the "not equal to" operator and the "double=", that is, ==, is a logical operation that returns TRUE if both sides are logically equal ("1" is also defined as TRUE) and FALSE otherwise. As those skilled in computer science will readily understand, in many cases the logical inverse of the expressions given below may be used instead, with accompanying adjustment to other expressions, to accomplish the same function.

In the following description, various method steps are described using functional notation that will be readily understandable to programmers working in the field of digital data security. For clarity, however, "~>" is used to indicate "hash chain", that is, the series of sibling values enabling computation upward through a hash tree (such as a Merkle tree) from a lowest level "leaf" value to a root value. Thus, the expression "$\ell \rightsquigarrow r$" means "the hash chain that leads from $\ell$ to $r$".

$V \leftarrow \mathcal{F}(\alpha, \beta, \ldots)$ indicates that an operation or function F operates on values $\alpha, \beta, \ldots$ (which may, but need not in every case be scalars) to return one or more value(s) V.

The notation hash(a, b, ...) or h(a, b, ...) below indicates a hash function that operates on input elements a, b, .... Most cryptographic hash functions of the type preferred for use in embodiments here are non-commutative with respect to their input elements. Many such hash functions are well known and may be used in embodiments. This is not a requirement for any embodiment, however, although it does generally increase the security of the hash function. In different examples below, input values to various functions are shown in a particular order. This is by way of example only; skilled programmers will readily understand how to change the order even for non-commutative functions and accomplish the same results as described below, as long as the order is kept consistent during other related operations.

Forward-Secure Tag System

As used in the context of this invention, a tag system is at least a triple of algorithms (Gen, Tag, Ver) such that 1) Gen generates pairs of public/secret keys pk/sk: (pk, sk)←Gen(k), where k is a security parameter that may be chosen in any conventional manner.

2) Tag generates a tag for a secret key and a time value t (in general, a value from any predefined ordered set T): tag←Tag(sk, t).

3) Ver checks the validity of a tag with respect to a public key and a time value: Ver(pk, tag, t) returns ACCEPT if tag=Tag(sk, t), or REJECT otherwise.

The tag system is forward-secure if, given a tag=Tag(sk, t), but not the secret key sk, it is computationally hard to generate any pair (tag', t') such that t'>t and Ver(pk, tag', t')=ACCEPT. Note that this condition above forbids only the forging of valid tags for time values greater than t. This condition is the main point of difference between tag systems and signature schemes.

Example: Tag System I

In this example, there are three main phases: Key Generation, Tagging, and Verification. These concepts are then applied in the embodiments of the invention.

Key generation—Any entity may start by choosing an expiration time T for the public/private key pair and then carries out the following:

1) Generate the secret key sk as a list (s[1], ..., s[T]), where each s[i] is a random (or otherwise unpredictable) value, which may be generated in any known manner.

2) Bind, that is, irrefutably associate, each value to its time slot: x[i]←h(i, s[i]) for i∈{1, ..., T}, where h is a cryptographic hash function.

3) Compute the public key pk by aggregating the key bindings into a Merkle hash-tree Tree[h], that is, pk←Tree[h](x[1], ..., x[T]), where h is a hash function and pk is the root node of the tree. In other words, the bindings x[i] may form "leaves" of a hash tree that iteratively combines them pairwise (or with higher order, such as using a ternary or higher tree) "upward" through the Merkle tree until a single, root value pk is obtained.

Tagging—Tag(sk, t)=(s[t], q), where q=h(t, s[t])$\rightsquigarrow$pk.

Verification—Ver(pk, (s, q), t) checks that q is a valid hash-chain from h(t, s) to pk. This may be done by recomputing (typically, iterative, pairwise hashing) upwards through the hash tree from the "leaf" (t, s) to a single, uppermost value, which should be pk.

Note that in this system, the same sk may, if desired for simplicity, be used several times, revealing the secret key component s[t] as the tag for any given time t.

Example: Tag-System II

Key generation—Choose the expiration time T of the public/private key pair, then:

1) Generate a one-time secret key sk as the list (z[0], ..., z[N]), where N=[$\log_2$ (T+1)]) and each z[i] is an unpredictable value, such as a random number chosen in any known manner.

2) Form the public key pk as a list (x[0], ..., x[N]), where x[i]←f(z[i]) for i∈{0, ..., N} and f is a one-way function, one example of which is a cryptographic hash function, which may, but need not be, the same as h.

Tagging—The tagging algorithm Tag(z[0], ..., z[N], t) outputs an ordered subset (z[j1], ..., z[jm]) of components (such as bits) of the secret key such that $2^{j1} + \ldots + 2^{jm} = t$ and j1<j2<...<jm. In words, if time t is represented in usual binary form, then the values j1, j2, ..., jm are the values of the exponents of 2 corresponding to the positions of t's non-zero bits, in order. As a very simple example, if $t=123_{10}=1111011_2$ then there are six non-zero bits, so j1, j2, j3, j4, j5, and j6=0, 1, 3, 4, 5, 6 respectively.

Verification—Ver(pk, (z[1], ..., z[m]), t) proceeds as follows:

1) Computes indices j1, ..., jm so that $2^{j1} + \ldots + 2^{jm} = t$ and j1<j2<...<jm 2) Checks that f(z[1])=x[j1], ..., f(z[m])=x[jm]

Note that in this system, sk can be used only once, since it is tied to time. A user who wants to generate several tags must prepare as many key pairs. Hash-tree aggregation can be used to combine the public keys of multiple one-time key pairs into one "master" public key, and membership of individual public keys in the set proven/verified using hash chains as in the previous example.

Shared Signature Embodiments

We now describe a family of signature embodiments that are based on tag systems and cryptographic time-stamping. Embodiments use the following components:

an asymmetric encryption system with encryption function E and decryption function D; any known encryption and decryption routines may be used, a server-side signature mechanism with signing function S and verification function V; any known routines may be used for S and the corresponding V.

a cryptographic time-stamping service with time-stamp generation function TSG and verification function TSV, a forward-resistant tag system with tag generation function Tag and verification function Ver, examples of which are described above Shared Signature with Tag See FIG. 1. Note that the time order of some of the steps need not be as shown; for example, some steps in different entities can be performed in a different order, or simultaneously. Which steps may be performed in a different order will become clear from the following description.

Key Generation

To begin the process, the client (100) issues a request to the server 200 to begin generating a signature Server (200) generates two pairs of secret and public keys (sk0, pk0) and (sk1, pk1) for (E,D) and (S,V), respectively.

User (10) chooses and memorizes a short (e.g. 5-digit) PIN code (which need NOT be stored on the device).

Client (100) generates secret and public keys (sk2, pk2) for (Tag, Ver), again, as described above or in any other known manner.

Registration

Client receives the public keys (pk0, pk1) from the server and stores them.

Server keeps a database DB with user data for request authentication registers the user's (pk2, PIN) by updating the database as follows: DB[pk2]←(pin:=PIN, failed:=0), where failed is a number of failed authentication attempts.

Signing—Signing a message m at time t (t must be in future):

Client 1) computes tag for time t: tag←Tag(sk2, t);
2) binds m with tag: y←h(m, tag);
3) encrypts: w←E(pk0, pk2, PIN, y, t);
4) sends w to the server.

Server 1) receives w from the client;
2) decrypts: (pk2, PIN, y, t)←D(sk0, w);
3) validates the request thus:
   checks that the account exists: if DB has no entry for pk2 then ABORT;
   checks that the account has not been blocked, for example, either by failing to correctly enter the PIN more than a maximum allowable number of times, such as three, thus: if DB[pk2].failed>3 then ABORT;
   checks that the PIN is correct: if DB[pk2].pin!=PIN then increment the counter DB[pk2].failed:=DB[pk2].failed+1 and ABORT;
   resets the counter: DB[pk2].failed=0;
4) creates the signature: c←S(sk1, y);
5) timestamps c: ts←TSG(c) at time t, for example, by submitting c to timestamping service (300);
6) returns (c, ts) to the client.

Client 1) receives (c, ts) from the server;
2) verifies the signature c: if V(pk1, c, y)!=ACCEPT then ABORT;
3) verifies the timestamp: TSV(ts, c, t)!=ACCEPT then ABORT;
4) releases the final signature (t, tag, c, ts).

Verification

To verify a signature (t, tag, c, ts) on m, the following checks must pass:

1) Ver(pk2, tag, t)==ACCEPT,
2) V(pk1, c, h(m, tag))==ACCEPT,
3) TSV(ts, c, t)==ACCEPT.

In this embodiment, the user is responsible for taking latency into account and for choosing t to be a future time. Moreover, the server is responsible for obtaining the timestamp "c" exactly at time t. This constraint may, however, be relaxed such that server must timestamp c at any time t' that is not later than t. Then the condition TSV(ts, c, t)==ACCEPT becomes TSV(ts, c, t')==ACCEPT and t'<=t both in signing and verification.

Shared Signature with Server-Side Partial Signatures

Figure 2:
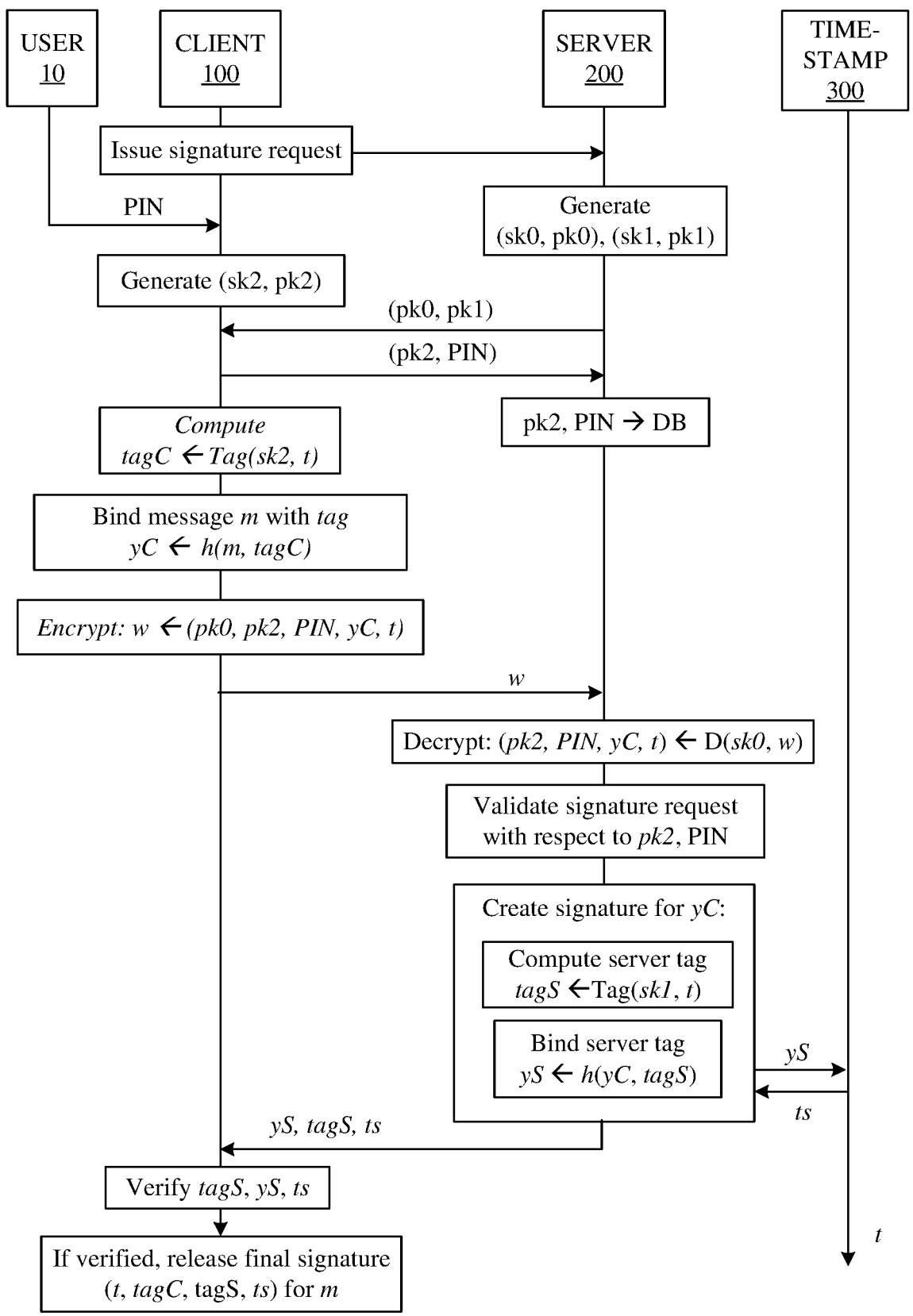
FIG. 2 is a functional flowchart of a second embodiment of a digital signature method in which part of signature formation is delegated by a client to a server.

See FIG. 2. As before, note that the time order of some of the steps need not be as shown; for example, some steps in different entities can be performed in a different order, or simultaneously. Which steps may be performed in a different order will become clear from the following description.

Key Generation

To begin the process, the client (100) may issue a request to the server 200 to begin the signature-generation process Server generates two pairs of secret and public keys (sk0, pk0) and (sk1, pk1) for (E,D) and (Tag,Ver), respectively User chooses and memorizes a short (e.g. 5-digit) PIN code (which is NOT stored on the device).

Client generates secret and public keys (sk2, pk2) for (Tag, Ver).

Registration—same as in the previous embodiment.

Signing—For signing a message m at time t (t must be in the future):

Client 1) computes client tag: tagC←Tag(sk2, t);
2) binds m with tag: yC←h(m, tagC);
3) encrypts: w←E(pk0, pk2, PIN, yC, t);
4) sends w to the server.

Server 1) receives w from the client;
2) decrypts: (pk2, PIN, yC, t)←D(sk0, w);
3) validates the request: same as in previous embodiment;
4) signs yC as follows:
   i. computes server tag: tagS←Tag(sk1, t);
   ii. binds server tag to client binding: yS←h(yC, tagS);
   iii. timestamps the server binding: ts←TSG(yS);
5) returns (t, tagS, ts) to the client.

Client 1) receives (yS, tagS, ts) from the server;
2) verifies server tag: if Ver(pk1, tagS, t)!=ACCEPT then ABORT;
3) recomputes server binding: yS:=h(yC, tagS);
4) verifies timestamp: if TSV(ts, yS, t)!=ACCEPT then ABORT;
5) releases the final signature (t, tagC, tagS, ts).

Verification—To verify signature (t, tagC, tagS, ts) on m against public keys (pk1 and pk2), the following checks must pass:

1) Ver(pk1, tagS, t)==Ver(pk2, tagC, t)==ACCEPT
2) TSV(ts, h(h(m, tagC), tagS), t)==ACCEPT This embodiment is more efficient than the previous one if tagging and tag verification run faster than the signature formation and signature verification above. As in the previous embodiment, the server can timestamp yS at any time t' that is not later than t; the time-stamp verification conditions should then be updated accordingly.

Cryptographic Time-Stamping

In the embodiments discussed above, time-stamping is used in several of the method steps. Many cryptographic time-stamping methods and systems are well-known and in use, and skilled programmers will be able to choose which of these to use in their implementations. One particularly advantageous service that may be used for time-stamping is the data signature infrastructure developed and marketed under the name "KSI" by Guardtime AS of Tallinn, Estonia. This system is described in general in U.S. Pat. No. 8,719, 576 (also Buldas, et al., "Document verification with distributed calendar infrastructure"). In summary, for each of a sequence of calendar periods (also referred to as "rounds", or "aggregation rounds", which are typically related one-to-one with physical time units, such as one second), the Guardtime infrastructure takes digital input records as inputs, that is, lowest-level tree "leaves". These are then cryptographically hashed together in an iterative, preferably (but not necessarily) binary hash tree, ultimately yielding an uppermost root hash value (a "calendar value") that encodes information in all the input records. This uppermost hash value is then entered into a "calendar", which is structured as a form of a type of blockchain which, in some implementations, may involve aggregating calendar values into a progressive hash tree. The KSI system then returns a signature in the form of a vector, including, among other data, the values of sibling nodes in the hash tree that enable recomputation of the respective calendar value if a purported copy of the corresponding original input record is in fact identical to the original input record.

Note that, in the KSI system, no signature is returned to any input entity until all inputs have been received for a given calendar period. This is because, until all inputs are received, it is not possible to compute the root hash value. One consequence of this is that, once a signature has been returned for an input, it is too late to attempt to get another signature for the same (or any other) input value in the same calendar period.

As long as it is formatted according to specification, almost any set of data, including concatenations or other combinations of multiple input parameters, may be submitted as the digital input records, which do not even have to comprise the same parameters. One advantage of the KSI system is that each calendar block, and thus each signature generated in the respective calendar time period, has an irrefutable relationship to the time when the block was created. In other words, a KSI signature also acts as an irrefutable timestamp, since the signature itself encodes time to within the precision of the calendar period.

Given the signature vector for a current, user-presented data record and knowledge of the hash function used in the hash tree, and the calendar value corresponding to a signature time, an entity will be able to verify (through hash computations as indicated by the signature vector) that a "candidate" record is correct even without having to access the signature/timestamping system at all.

In some KSI implementations, calendar values are combined, for example, using a progressively growing Merkle tree, the root of which is periodically entered into an irrefutable medium such as a widely witnessed publication, website, additional blockchain, database, etc. The KSI signature vector may then be extended with additional elements to enable recomputation beyond the corresponding calendar value to the publication value.

We claim:

1. A method for digitally signing a message, comprising, in a client device:
    issuing a signature request to a server;
    generating a first signature part as functions of selected ones of first signature parameters;
    receiving from the server a second signature part, said second signature part being computed by the server as functions of second signature parameters and at least one of the first signature parameters;
    verifying components of the second signature part;
    generating a final digital signature of the message from the first and second signature parts only if the components of the second signature part are valid;
    receiving a secret value from a user;
    sending to the server a public key of a third key pair and the secret value;
    receiving from the server public components of a first public-private key pair and a second public-private key pair;
    computing first signature parameters as functions of a secret key of the third key pair, a time value, and the message;
    computing an encryption value as an encryption of at least selected ones of the first signature parameters;
    transmitting the encryption value to the server;
    receiving from the server said second signature part in the form of at least one second signature parameter and a corresponding timestamp;
    verifying the second signature parameters and generating a final digital signature of the message only if the second signature parameters are valid;
    computing the first signature parameters by computing a client-side tag value as a function of a secret key of the third key pair and a tag time; and
    computing a client-side binding of the message with the client-side tag value.

2. The method of claim 1, in which the client-side binding is a cryptographic hash value of the message and the client-side tag value.

3. The method of claim 1, comprising computing the encryption value as an encryption function of the public keys of the first and third key pairs, the secret value, the client-side binding, and the tag time.

4. The method of claim 3, in which the at least one second signature parameter is computed in the server as a function of a decryption of a secret key of the first key pair and the encryption value.

5. The method of claim 4, in which the public key of the third key pair and the secret value are validated within the server before the at least one second signature parameter is computed in the server.

6. The method of claim 5, in which the second signature part is computed within the server as a time-stamped server-side signature of a secret key of the second key pair and the client-side binding, in which the time of time-stamping is later than the tag time.

7. The method of claim 6, in which verifying the second signature parameters comprises:
    verifying the server-side signature using the public key of the second key pair, the server-side signature, and the client-side binding; and
    verifying the timestamp.

8. The method of claim 7, in which the final digital signature for the message comprises the tag time, the client-side tag value, the server-side signature, and the timestamp.

9. The method of claim 6, in which the second signature part is computed within the server as a time-stamped server-side binding of the client-side binding and a server-side tag value, said server-side tag value being computer as a tag of a secret key of the second key pair and the tag time, in which the time of time-stamping is later than the tag time, said second signature parameters comprising the server-side binding, the server-side tag value, and the timestamp.

10. The method of claim 9, in which verifying the second signature parameters comprises:
- confirming validity of the server tag as a function of the public key of the second key pair, the server-side tag value, and the tag time;
- confirming, by recomputing, server binding; and
- verifying the timestamp.

11. The method of claim 1, further comprising:
- generating the secret key of the third key pair by:
  - generating an ordered set of unpredictable values; and
  - binding each unpredictable value to a respective time slot that is no greater than a predetermined expiration time;
- computing the corresponding public key of the third key pair by aggregating the bindings of the unpredictable values into a hash-tree, a root of said hash tree forming the public key of the third key pair.

12. The method of claim 11, comprising binding each unpredictable value to its respective corresponding time slot by cryptographic hashing.

13. The method of claim 1, further comprising:
- selecting the secret key of the third key pair as a one-time secret key from a first ordered list of $N+1$ unpredictable values, where $N=\lceil \log_2 (T+1) \rceil$ and $T$ is a predetermined expiration time;
- forming each public key of the third key pair as a respective second ordered list of public key values such that each public key value is a cryptographic hash of the respective corresponding unpredictable value in the first ordered list.

* * * * *